(12) United States Patent
Roberts

(10) Patent No.: US 7,956,768 B2
(45) Date of Patent: Jun. 7, 2011

(54) SYSTEM FOR METERING VEHICULAR TRAFFIC AT A TOLL PLAZA

(76) Inventor: Howard H. Roberts, Newtown, PA (US)

( * ) Notice: Subject to any disclaimer, the term of this patent is extended or adjusted under 35 U.S.C. 154(b) by 283 days.

(21) Appl. No.: 12/402,326

(22) Filed: Mar. 11, 2009

(65) Prior Publication Data

US 2010/0231415 A1   Sep. 16, 2010

(51) Int. Cl.
 *G08G 1/00* (2006.01)
(52) U.S. Cl. ........ 340/928; 340/907; 701/116; 701/117; 701/118; 701/119; 705/13; 705/417; 705/418; 235/384; 235/378
(58) Field of Classification Search .................. 340/928, 340/907; 701/116, 117, 118, 119; 705/13, 705/417, 418; 235/384, 378
See application file for complete search history.

(56) References Cited

U.S. PATENT DOCUMENTS

| | | |
|---|---|---|
| 3,750,099 A | 7/1973 | Proctor |
| 3,797,450 A | 3/1974 | Frisbee |
| 3,829,682 A | 8/1974 | Geiger |
| 3,872,423 A | 3/1975 | Yeakley |
| 5,646,853 A | 7/1997 | Takahashi et al. |
| 5,864,304 A | 1/1999 | Gerszberg et al. |
| 7,150,552 B2 | 12/2006 | Weidel |
| 2007/0278300 A1 * | 12/2007 | Dawson et al. ............... 235/384 |

* cited by examiner

*Primary Examiner* — George A Bugg
*Assistant Examiner* — Ojiako Nwugo
(74) *Attorney, Agent, or Firm* — Nydegger & Associates

(57) ABSTRACT

A system and method is provided for metering vehicular traffic. Specifically, the system uses a computer to prevent delays as vehicles transition from a greater number of toll lanes to a lesser number of travel lanes. Toll collection devices are used to send a ready signal to a computer to indicate a vehicle is ready to leave a start point. The computer receives ready signals from the toll collection devices and uses a pre-programmed departure schedule to queue the vehicles. After the vehicles are queued, the computer uses time delay variables to ensure efficient traffic flow between the toll lanes of the plaza and the travel lanes of the bridge or tunnel. An indicator signal responsive to a departure signal sent by the computer is employed to direct vehicles from a start point towards a travel lane.

20 Claims, 2 Drawing Sheets

SYSTEM FOR METERING VEHICULAR TRAFFIC AT A TOLL PLAZA

FIELD OF THE INVENTION

The present invention pertains generally to systems and methods for metering vehicular traffic. More particularly, the present invention pertains to systems and methods for metering the movements of vehicles from respective start points in a plurality of traffic lanes into a common travel lane. The present invention is particularly, but not exclusively, useful as a system and method for metering vehicular traffic moving through multi-lane toll plazas at the entrance to bridges or tunnels.

BACKGROUND OF THE INVENTION

Typically, a toll plaza at the entrance to a tunnel or bridge is laid out with multiple toll booths. If so, each toll booth will service a separate lane, from which access to the bridge or tunnel is granted upon payment of a toll. In most cases, the number of toll lanes will significantly exceed the number of lanes available for travel across the bridge or through the tunnel. When traffic is heavy, the main area for "bottlenecks" causing significant traffic delays is between the toll booth and the bridge or tunnel, in an area that is generally referred to as a departure transition zone. Vehicles moving from the departure transition zone toward the bridge or tunnel are unable to merge smoothly if drivers erratically change speeds or aggressively change lanes. Instead, due to these improper driving techniques, drivers often block multiple lanes of traffic or cause accidents that result in further delays. Even without accidents, the theoretical capacity of the bridge or tunnel is significantly reduced because of the tremendous friction produced by the irregular flow of vehicles.

In light of the above, it is an object of the present invention to provide systems and methods for metering the flow of traffic through a toll plaza that effectively maintains a steady flow of traffic through the departure transition zone as the number of same-way traffic lanes is significantly reduced. Another object of the present invention is to improve efficiency by increasing the volumetric flow rate of vehicles passing through the bridge or tunnel. A further object of the present invention is to provide a system and method for controlling vehicular traffic that is easy to implement, is simple to use, and is comparatively cost effective.

SUMMARY OF THE INVENTION

In accordance with the present invention, systems and methods for metering vehicular traffic at a toll plaza are provided for the purpose of avoiding congestion in an area between the toll lanes of the toll plaza and the travel lanes of a bridge or tunnel. This area is commonly referred to as a departure transition zone. In particular, the systems and methods of the present invention pertain to vehicles at a plurality of start points moving into the travel lanes of a bridge or tunnel. For the purposes of the present invention, the start point is the location where a vehicle waits after paying a toll and before moving into the departure transition zone. Generally, the start point is the same location where the toll is paid and will be delineated by lines painted on the pavement and a barrier gate. For purposes of the present invention, the plurality of start points will be subdivided into groupings called zones, with a Zone A being the inner toll lanes with the shortest straight-line distance to the travel lanes and a Zone B being the outer toll lanes with the longer distance to the travel lanes. Additional zones can be added as needed to more effectively manage traffic flow. Furthermore, the number of travel lanes per zone will vary based on the individual characteristics of each toll plaza. Essentially, the systems and methods of the present invention require the concerted implementation of three components. These are: 1) a toll collection device to generate a ready signal for the vehicle at the start point, 2) a computer system responsive to the ready signal to establish a "go" signal for the vehicle in accordance with a pre-programmed departure schedule, and 3) an indicator to initiate vehicle movement from the start point into the departure transition zone.

Structurally, the system of the present invention includes a toll collection device positioned at each start point. The toll collection device can be of any type well-known in the pertinent art. As indicated above, the purpose of the toll collection device is to validate payment, and to create a ready signal. This ready signal will then electronically notify the computer that a vehicle is available to be assigned a position in a queue for entering the travel lane. Specifically, after the computer receives the ready signal, the computer places the vehicle into the queue for entering the travel lane in accordance with the pre-programmed departure schedule. Furthermore, the system includes an indicator in the form of a red "stop" light and a green "go" light. The red "stop" light provides a visual signal to direct the vehicle to wait at the start point while the green "go" light provides a visual signal to direct the vehicle from the start point and into the departure transition zone.

Functionally, the system of the present invention utilizes the computer to respond to ready signals from the plurality of start points. Upon arrival at the start point, the vehicle pays the toll, and the toll collection device validates the payment and sends a ready signal to the computer. When the ready signal is received, the computer uses the pre-programmed departure schedule to queue the vehicle for entry into the travel lane. Throughout the process, continuous updates are made to the queue as vehicles enter the departure transition zone and other vehicles arrive at the start points. As soon as the computer determines the vehicle can proceed into the departure transition zone, an electronic departure signal is sent directing the indicator positioned at the start point to display the "go" signal.

In order to ensure unimpeded movement through the departure transition zone, the pre-programmed departure schedule assigns each vehicle in the queue a unique departure time. In addition to its own place in the queue, the other factors used to set the departure time for the vehicle waiting at the start point are the departure time of the previously released vehicle and its departure zone. When the previously released vehicle is from the same zone as the next vehicle in the queue, the computer uses a first time delay to establish the departure time for the next vehicle in queue and to ensure adequate spacing. When the previously released vehicle is from a different zone, the computer will use a second time delay to ensure adequate spacing. The reason for the two distinct time delay values is to account for the greater time taken by a vehicle leaving from Zone B (outer toll lanes) to reach the travel lanes of the tunnel or bridge as compared to a vehicle leaving from Zone A (inner toll lanes). The use of time delay variables ensures vehicles enter the departure transition zone only after the previously released vehicle has moved close enough to the travel lanes so the two vehicles will not impede each other's movement and cause a delay.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
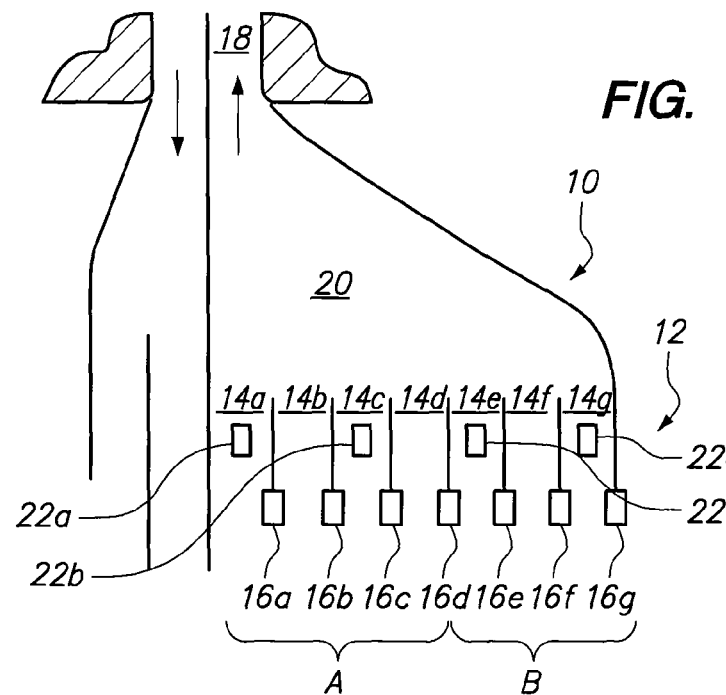
FIG. 1 is a schematic of a toll plaza.

Referring initially to FIG. 1, a layout for metering traffic in accordance with the present invention is shown and generally designated 10. An exemplary toll plaza within the layout 10 where traffic is metered in accordance with the present invention is schematically shown and is designated 12. As shown, the toll plaza 12 is divided into two zones: a Zone A that includes toll lanes 14a-d, and a Zone B that includes toll lanes 14e-g. In the toll plaza 12 shown, each toll lane 14a-g has an associated start point 16a-g. In this exemplary illustration, seven toll lanes 14a-g feed into a single travel lane 18. Between the toll lanes 14a-g and the travel lane 18, the toll plaza 12 establishes a departure transition zone 20 where the seven toll lanes 14a-g transition to the single travel lane 18. As illustrated, a vehicle 22c in toll lane 14e of Zone B has a greater distance to travel from its start point 16e to reach the travel lane 18 than does a vehicle 22a in toll lane 14a of Zone A. For illustrative purposes, the exemplary toll plaza 12 consists of seven start points 16a-g and seven associated toll lanes 14a-g. Actual control of vehicles 22a-d through the departure transition zone 20 requires a computer 24 (see FIG. 2).

Figure 2:
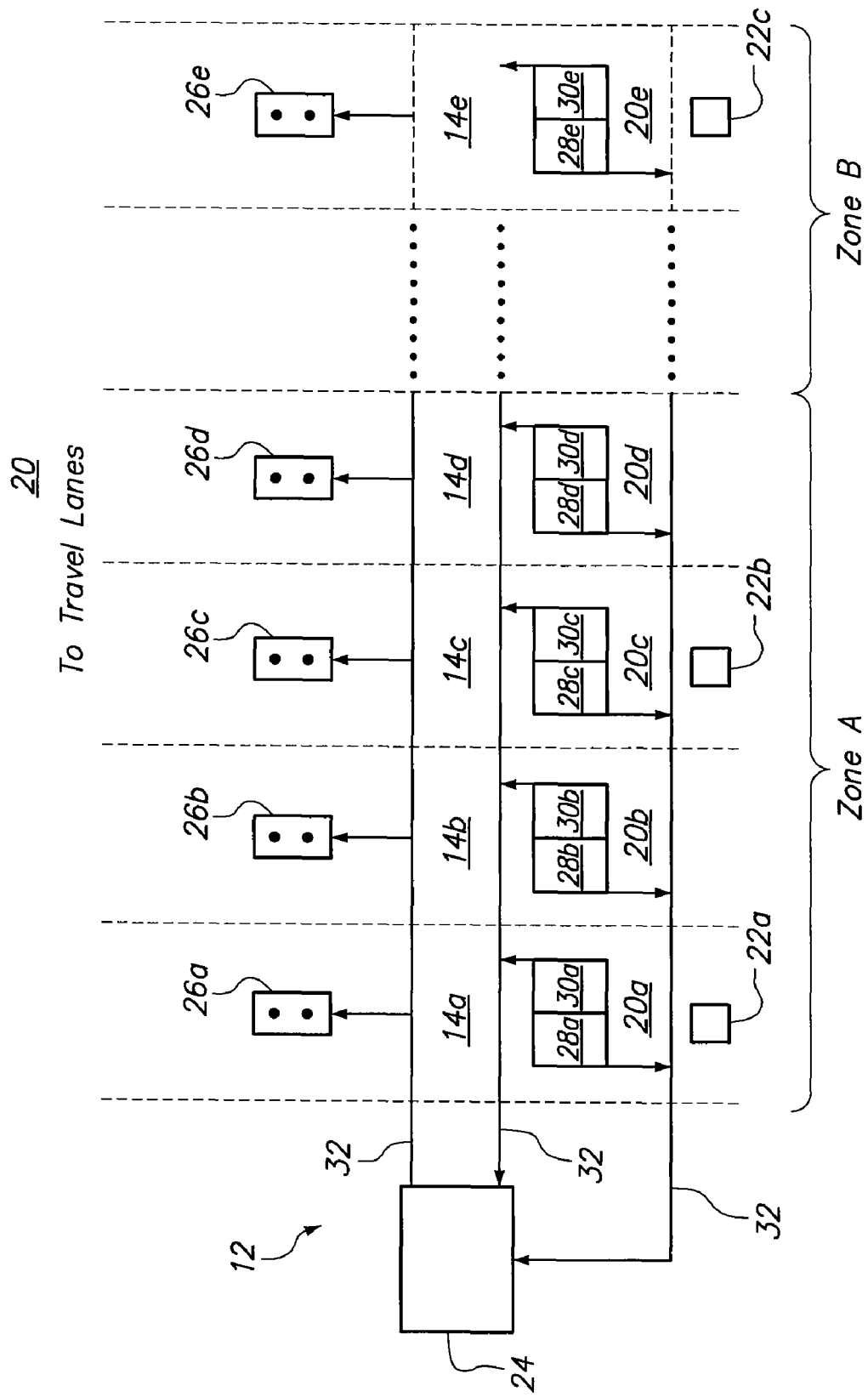
FIG. 2 is a schematic showing the inter-relationships of components for the present invention at the toll plaza.

FIG. 2 shows the relative location of the components at the toll plaza 12. Notably, the computer 24 is housed in a central location and is electronically connected to each start point 16a-e. Furthermore, each start point 16a-e has a respective indicator 26a-e and a respective toll collection device 28a-e. In an alternate embodiment, each start point 16a-e may also have a sensor 30a-e in the form of an inductive coil embedded in the pavement (not shown). Preferably, each sensor 30a-e is a pneumatic tube laid across the lanes, or any other type sensor well-known in the pertinent art. For the purposes of the present invention, the sensor 30a-e verifies when a vehicle 22a-d has entered the departure transition zone 20. Structurally, the toll collection device 28a-e and the sensor 30a-e are positioned on the approach side of the start point 16a-e, while the indicator 26a-e is positioned between the departure transition zone 20 and the toll collection device 28a-e. Further, a plurality of transmission lines 32 runs to and from the computer 24 and allows for the sending and receiving of electronic signals to and from the indicators 26a-e, toll collection devices 28a-e, and sensors 30a-e.

FIG. 2 further indicates that the present invention is controlled by the computer 24. After the vehicle 22a-d pays the required toll, the toll collection device 28a-e registers the payment with the computer 24. When the toll is registered, the sensors 30a-e electronically send an arrival signal to the computer 24 to indicate the presence of the vehicle 22a-d at the start point 16a-e. Then, the computer 24 processes the information received using a pre-programmed departure schedule and queues the vehicles 22a-d for entry into the travel lane 18. After determining the vehicle 22a-d can depart the start point 16a-e, the computer 24 sends an electronic departure signal to the corresponding indicator 26a-e to allow the vehicle 22a-d to move from the start point 16a-e into the travel lane 18. At the same time, the computer 24 sends signals to the indicators 26a-e for all other vehicles 22a-d at start points 16a-e to remain in place.

When assigning each vehicle 22a-d a relative start time, the computer 24 considers four pre-programmed time delay variables. Specifically, the four time delay variables are defined as follows: $\Delta_1$ is the time delay established between starts for sequential vehicles in Zone A; $\Delta_2$ is the time delay established between starts when a vehicle in Zone A follows a vehicle in Zone B; $f\Delta_1$ is the time delay established when a vehicle in Zone B follows a vehicle from Zone A; and $h\Delta_2$ is the time delay established between starts for sequential vehicles in Zone B. The resultant, or staggered, start times ensure vehicles 22a-d leaving the start points 16a-g will have adequate spacing and not cause a traffic delay in the departure transition zone 20. As illustrated, Zone B is located further from the travel lane 18 than Zone A. Establishing values for these variables will account for the individual characteristics of each toll plaza 12. Moreover, values for the variables can be updated at any time to more accurately reflect traffic conditions at the toll plaza 12 or any physical changes made to the toll plaza 12 or the travel lane 18.

As envisioned for the present invention, $\Delta_2 > \Delta_1$, $f < 1$, and $h\Delta_2 \approx \Delta_1$. This allows more time for the vehicle 22c entering from Zone B to get ahead of the vehicle 22a entering from Zone A. This is necessary since the Zone B vehicle 22c must traverse a greater distance through the departure transition zone 20. For the vehicle 22c in Zone B, the shortened delay, $f\Delta_1$, accounts for the head start advantage of the Zone A vehicle 22a which has a shorter distance to travel from the start point 16a to the travel lane 18. Consequently, $f < 1$, and is envisioned to be in a range of about 0.5 to 0.8. Finally, $h\Delta_2$ provides the time delay for sequential vehicles 22c-d coming from Zone B. Since both $\Delta_1$ and $h\Delta_2$ both relate to sequential vehicles leaving the same zone, their values will likely be the same.

Figure 3:
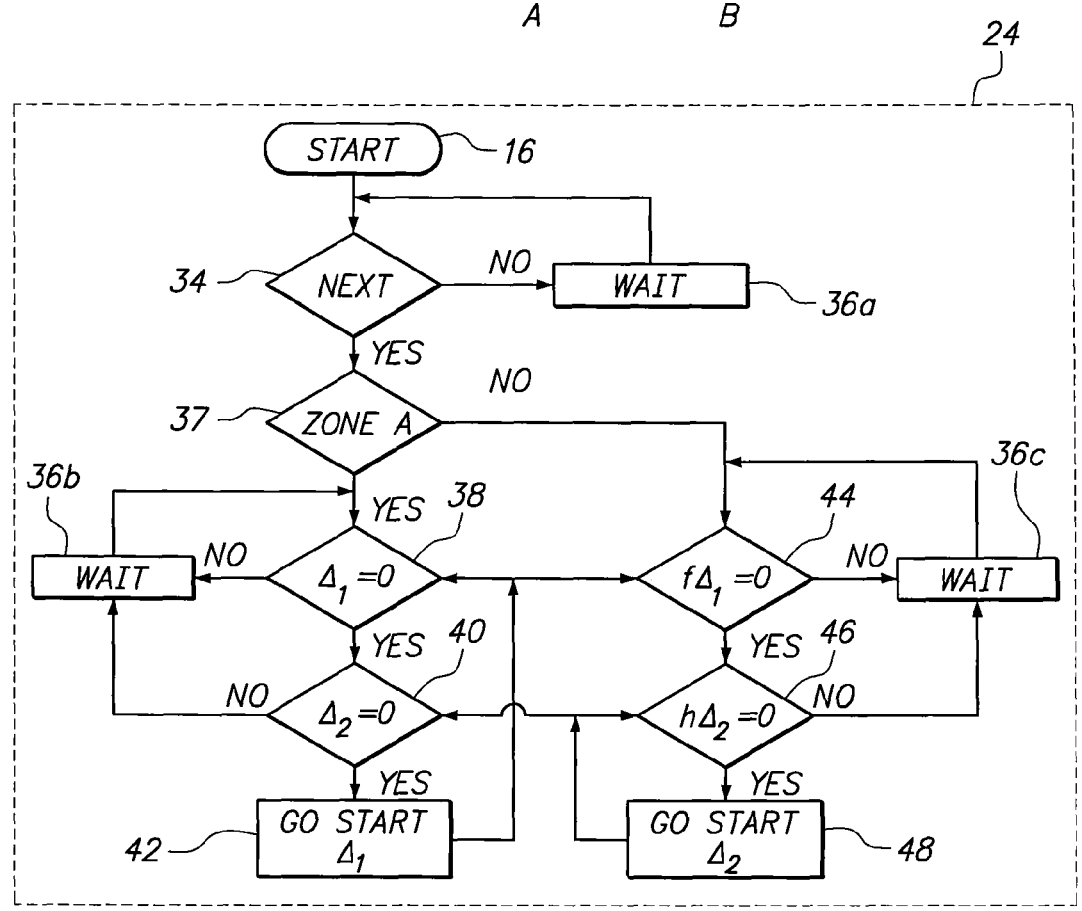
FIG. 3 is a logic chart showing the operation of "stop" and "go" signals at a start point in the toll plaza.

Referring to FIG. 3, a logic chart shows the operation of the pre-programmed departure schedule at each start point 16. As shown, the first inquiry is whether the vehicle is next (see inquiry block 34). If the vehicle is not next, it waits at action block 36a. If the vehicle is next, the computer determines if the vehicle is in Zone A. If the vehicle is in Zone A (see inquiry block 37), it proceeds to inquiry block 38. If $\Delta_1$ is equal to zero at inquiry block 38, the vehicle proceeds to inquiry block 40. If $\Delta_1$ is not equal to zero, the vehicle waits at action block 36b. At inquiry block 40, if $\Delta_2$ is zero, the vehicle is released into the departure transition zone at action block 42 and the two $\Delta_1$ variables are reset. If $\Delta_2$ is not equal to zero, the vehicle will wait again at action block 36b.

Still referring to FIG. 3, if the vehicle is not in Zone A (see inquiry block 37), the status for vehicle 22c-d proceeds to block 44 to determine whether $f\Delta_1$ is equal to zero. If it is, the status for vehicle proceeds to inquiry block 46. If $f\Delta_1$ is not equal to zero, the vehicle 22c-d waits at block 36c. If $f\Delta_1$ is equal to zero, the vehicle proceeds to block 46 where the value of $h\Delta_2$ is determined. If $h\Delta_2$ is equal to zero, the vehicle 22c-d moves to action block 48 where it enters the departure transition zone 20. If $h\Delta_2$ is not equal to zero, the vehicle waits at action block 36c.

Operationally, four scenarios are possible using the logic chart. For the purposes of the four scenarios, consider vehicles 22a and 22b are at start points located in Zone A and vehicles 22c and 22d are located at start points in Zone B (see FIG. 1). The four scenarios are as follows: a vehicle 22b from Zone A following another vehicle 22a from Zone A; a vehicle 22c from Zone B following a vehicle 22a from Zone A; a vehicle 22a from Zone A following a vehicle 22c from Zone B; and a vehicle 22d from Zone B following another vehicle 22c from Zone B.

In the first scenario, a Zone A vehicle 22b follows another Zone A vehicle 22a. Using the logic chart, vehicle 22b is at the start point as soon as vehicle 22a is released at action block 42 and the value for $\Delta_1$ is reset. As vehicle 22b reaches the start point and is determined to be next in the queue and in Zone A, the status of vehicle 22b moves to block 38 and waits at block 36b until $\Delta_1$ is equal to zero. Once $\Delta_1$ is zero, the status moves to inquiry block 40, and moves forward because $\Delta_2$ must be equal to zero for vehicle 22a to move into the departure transition zone 20. When the previous vehicle did not depart from Zone B, the values of $\Delta_2$ and $h\Delta_2$ are zero.

In the second scenario, a Zone B vehicle 22c follows a Zone A vehicle 22a. As vehicle 22a enters the departure transition zone 20 at block 42, the value for $\Delta_1$ is reset. Once the value for $\Delta_1$ is reset and vehicle 22c is determined to be next and not in Zone A, vehicle 22c moves to inquiry block 44 and waits at block 36c until the value for $f\Delta_1$ is zero. When the value for $f\Delta_1$ is zero, vehicle 22c moves through inquiry block 46 to action block 48 and enters the departure transition zone 20. Because the previous vehicle 22a left from Zone A, the value for $h\Delta_2$ remained at zero allowing vehicle 22c to move through inquiry block 46.

In the third scenario, a Zone A vehicle 22a follows a Zone B vehicle 22c. Once vehicle 22c enters the departure transition zone at block 48, the value for $\Delta_2$ is reset. After vehicle 22c enters the departure transition zone, vehicle 22a is determined to be next and to be in Zone A. Vehicle 22a moves through inquiry block 38 because $\Delta_1$ is equal to zero since the previous vehicle exited from Zone B, so the value for $\Delta_1$ remained at zero. Next, vehicle 22a reaches block 40 and waits at action block 36b until $\Delta_2$ is equal to zero before moving to block 42 and into the departure transition zone 20.

In the fourth scenario, a Zone B vehicle 22d follows another Zone B vehicle 22c. As vehicle 22c enters the departure transition zone 20, vehicle 22d moves from the start point 16e. Once the pre-programmed departure schedule determines vehicle 22c is next, it moves to inquiry block 44 because vehicle 22d is not in Zone A. At block 44 $f\Delta_1$ is equal to zero and $\Delta_1$ is equal to zero since the previous vehicle left from Zone B meaning $\Delta_1$ was not reset. Next, vehicle 22d moves to inquiry block 46 and waits at block 36c until the value of $h\Delta_2$ is zero. Once $h\Delta_2$ is zero, vehicle 22d moves to block 48 and into the departure transition zone 20.

While the particular System for Metering Vehicular Traffic at a Toll Plaza as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for metering a plurality of vehicles through a toll plaza, wherein each vehicle has a start point in a respective toll lane for movement into a travel lane, the system comprising:
    a toll collection device positioned at each start point for creating a ready signal indicating the vehicle at the start point is available to be assigned a place in a queue for the travel lane;
    a computer for receiving the ready signal and managing the queue in accordance with a pre-programmed departure schedule, wherein the pre-programmed departure schedule establishes a departure time and a departure signal for the vehicle after processing the ready signals from other start points; and
    an indicator positioned at the start point, the indicator being electronically connected to the computer and responsive to the departure signal from the computer to initiate movement of the vehicle from the start point into the travel lane.

2. A system as recited in claim 1 wherein the number of toll lanes is greater than the number of travel lanes.

3. A system as recited in claim 2 wherein each zone includes a plurality of start points.

4. A system as recited in claim 3 wherein the indicator has one color for signaling the vehicle to remain at the start point and a different color for signaling the vehicle to move into the travel lane.

5. A system as recited in claim 3 wherein the indicator comprises:
    a red light for signaling the vehicle to remain at the start point; and
    a green light for signaling the vehicle to move into the travel lane.

6. A system as recited in claim 3 wherein the indicator is an LED display to provide movement instructions to vehicles at each respective start point.

7. A system as recited in claim 3 wherein the indicator comprises:
    a red light for signaling the vehicle to remain at the start point;
    a green light for signaling the vehicle to move into the travel lane; and
    an LED display for providing movement instructions to vehicles at each respective start point.

8. A system as recited in claim 3 wherein the indicator is a barrier gate.

9. A system as recited in claim 3 wherein the computer incorporates a first time delay variable, $\Delta_1$, for ensuring adequate spacing between sequential vehicles entering the travel lane from Zone A, a second time delay variable, $\Delta_2$, for ensuring adequate spacing between a vehicle from Zone A following a vehicle from Zone B, a third time delay variable, $f\Delta_1$, for a vehicle from Zone B following a vehicle from Zone A, and a fourth time delay variable, $h\Delta_2$, for ensuring adequate spacing between sequential vehicles entering from Zone B.

10. A system as recited in claim 3 further comprising a sensor positioned at the start point, wherein the sensor confirms the vehicle departing from the start point.

11. A system for metering a plurality of vehicles through a toll plaza, wherein each vehicle has a respective start point at a toll lane for movement into a travel lane, the system comprising:
    a means for creating a ready signal indicating a vehicle is ready to be placed into a queue for the travel lane;
    a means for electronically transferring the ready signal to a computer;
    a means for receiving the ready signal from a plurality start points and queuing the vehicles in response to a pre-programmed departure schedule;
    a means for establishing a departure signal for the vehicle; and
    a means for activating an indicator at the start point in response to the computer for advancement of the vehicle at the start point into the travel lane.

12. A system as recited in claim 11 wherein each zone includes a plurality of start points.

13. A system as recited in claim 12 wherein the computer controls the receiving means and the activating means.

14. A system as recited in claim 11 further comprising a toll collection device for controlling the creating means and the transferring means.

15. A system as recited in claim 14 wherein the computer incorporates a first time delay variable, $\Delta_1$, for ensuring adequate spacing between sequential vehicles entering the travel lane from Zone A, a second time delay variable, $\Delta_2$, for ensuring adequate spacing between a vehicle from Zone A following a vehicle from Zone B, a third time delay variable, $f\Delta_1$, for a vehicle from Zone B following a vehicle from Zone A, and a fourth time delay variable, $h\Delta_2$, for ensuring adequate spacing between sequential vehicles entering from Zone B.

16. A method for metering a plurality of vehicles through a toll plaza, wherein each vehicle has a respective start point at a toll lane for movement into a travel lane, the method comprising the steps of:
- creating a ready signal to indicate the presence of a vehicle at the start point;
- transferring the ready signal to a computer;
- processing the ready signal in accordance with a pre-programmed departure schedule to establish a departure signal for the vehicle, wherein the computer uses the pre-programmed departure schedule to queue vehicles from a plurality of start points; and
- activating a signal at the start point in response to the departure signal for indicating advancement of the vehicle at the start point into the travel lane.

17. A method as recited in claim 16 wherein each zone has a plurality of start points.

18. A method as recited in claim 17 wherein a toll collection device is used for creating a ready signal.

19. A method as recited in claim 18 wherein the signal comprises:
- a red light for signaling the vehicle to remain at the start point; and
- a green light for signaling the vehicle to depart from the start point.

20. A method as recited in claim 19 wherein the computer incorporates a first time delay variable, $\Delta_1$, for ensuring adequate spacing between sequential vehicles entering the travel lane from Zone A, a second time delay variable, $\Delta_2$, for ensuring adequate spacing between a vehicle from Zone A following a vehicle from Zone B, a third time delay variable, $f\Delta_1$, for a vehicle from Zone B following a vehicle from Zone A, and a fourth time delay variable, $h\Delta_2$, for ensuring adequate spacing between sequential vehicles entering from Zone B.

* * * * *